United States Patent [19]
Nerin

[11] Patent Number: 6,100,965
[45] Date of Patent: Aug. 8, 2000

[54] LASER SPEED MEASUREMENT AND RANGE FINDING DEVICE

[75] Inventor: Philippe Nerin, Nages et Sologve, France

[73] Assignees: Commissariat a l'Energie Atomique, Paris; Compagnie Generale des Matieres Nucleaires, Velizy-Villacoublay, both of France

[21] Appl. No.: 09/053,198

[22] Filed: Apr. 1, 1998

[30] Foreign Application Priority Data

Apr. 2, 1997 [FR] France ................................... 97 03996

[51] Int. Cl.$^7$ ................................ G01C 3/08; G01P 3/36
[52] U.S. Cl. ........................................ 356/5.09; 356/28.5
[58] Field of Search ................... 356/28.5, 5.09

[56] References Cited

U.S. PATENT DOCUMENTS

| | | | |
|---|---|---|---|
| 4,611,912 | 9/1986 | Falk et al. | 356/5 |
| 4,928,152 | 5/1990 | Gerardin | 356/5 |
| 5,114,226 | 5/1992 | Goodwin et al. | 356/5 |
| 5,594,543 | 1/1997 | Groot et al. | 356/5.09 |

FOREIGN PATENT DOCUMENTS

| | | |
|---|---|---|
| 164181B1 | 12/1985 | European Pat. Off. . |
| 2706602 | 6/1993 | France . |
| 2251150A | 6/1992 | United Kingdom . |

OTHER PUBLICATIONS

Okamoto set al: "Ultrahighly Sensitive Laser–Doppler Velocity Meter with a Diode–Pumped ND:YV04 Microchip Laser" Review of Scientific Instruments, vol. 66, No. 5, mai 1995, pp. 3116–3120, XP000507796.
A. Eda et al., CLEO'92, paper CWG 33, p. 282, 1992 (conf. on Laser and Electrooptics, Anaheim, USA, May 1992).
"The Antenna Properties of Optical Heterodyne Receivers", by A.E. Siegman, Applied Optics, vol. 5, No. 10, Oct. 1996, pp. 1588–1594.
"Heterodyne detection: phase front alignment, beam spot size and detector uniformity", by Steven C. Cohen, Applied Optics, vol. 14, No. 8, Aug. 1975, pp. 1953–1959.
"Analysis of heterodyne efficiency for coherent laser radars", by Fowler et al., SPIE, vol. 1936, 1993, pp. 137–146.
"Ranging and velocity signal generation in a backscatter- –modulated laser diode", by P.J. de Groot et al., Applied Optics, vol. 27, No. 21, 1988, pp. 4475–4480.
"Non–linear phenomena in semiconductor lasers", by K. Otsuka, SPIE, vol. 1497, pp. 432–443.
"Ultrahigh sensitivity laser Doppler velocimetry with a microchip solid–state laser", by K. Otsuka et al., Applied Optics, Fe. 1944, vol. 33, No. 6.

*Primary Examiner*—Stephen C. Buczinski
*Attorney, Agent, or Firm*—Pearne, Gordon, McCoy & Granger LLP

[57] ABSTRACT

The purpose of this invention is a laser speed measurement and range finding device, with coherent detection comprising:
  a microlaser (10) with continuous emission comprising an active laser medium (10) and a microlaser cavity (16, 18),
  means (20, 22, 24) for modulating an optical frequency of a beam output by the microlaser,
  means (28) of outputting a signal depending on:
    firstly, the Doppler frequency $$F_D = \frac{2V}{\lambda}$$

where $\lambda$ is the microlaser emission wave length and V is the speed of the target (2) to be detected,
  secondly, a modulation frequency $F\tau$ caused by interference in the cavity of the frequency modulated laser oscillation and the signal from a target (2) placed at a distance Z.

8 Claims, 3 Drawing Sheets

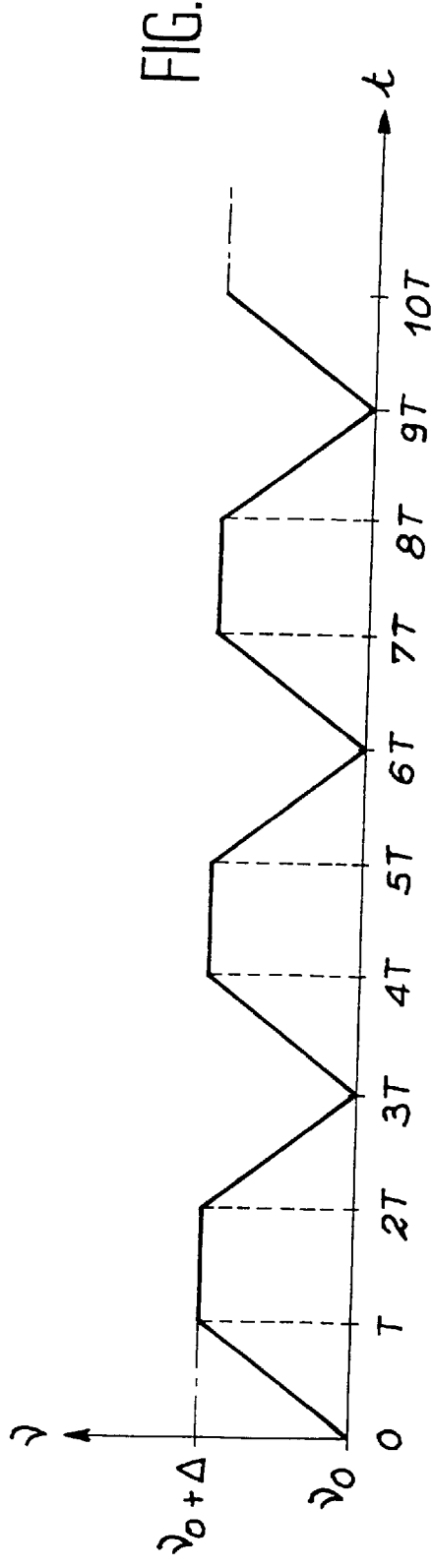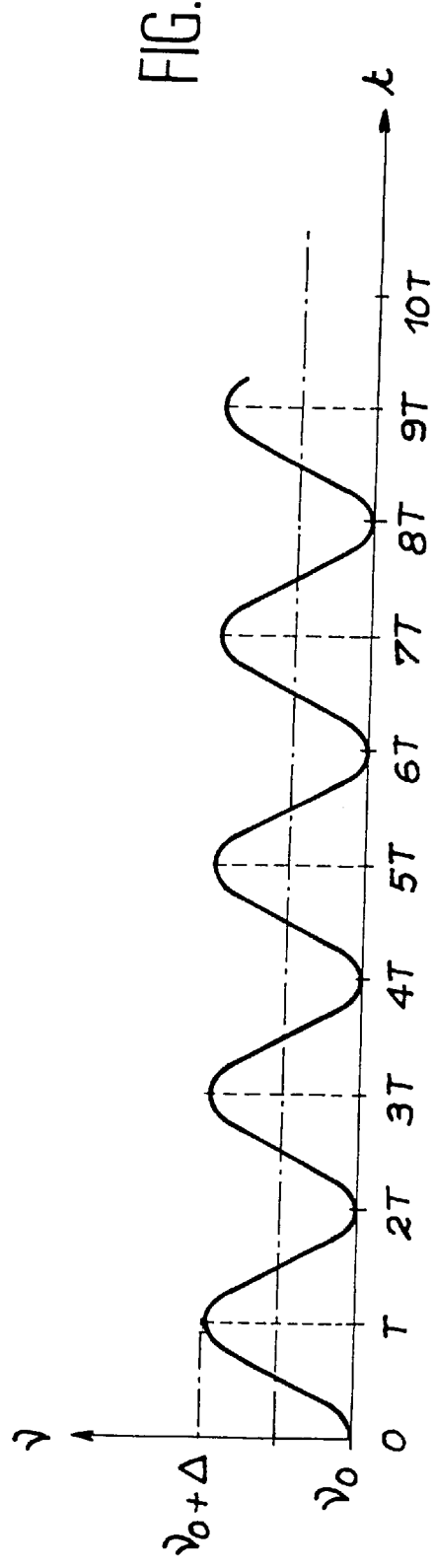

LASER SPEED MEASUREMENT AND RANGE FINDING DEVICE

DESCRIPTION

1. Technical Field

This invention relates to an optical device using a coherent detection, applied particularly to laser speed measurement and range finding. Some other examples of the application include chemical analysis of gaseous constituents, analysis of speed ranges, contact free metrology, laser imagery and medical instrumentation.

2. State of Prior Art

At optical wave lengths, there are various problems in coherent detection, particularly problems of matching fields on the detector (phase matching and amplitude matching) and fluctuations in the intensity and phase of the optical signal caused by interaction of the beam with disordered media.

There are various known solutions for solving the first two problems.

Thus miscellaneous conditions for optimizing interference of fields on the detector are described in articles written by A. E. Siegman entitled "The antenna properties of optical heterodyne receivers" that appeared in Applied Optics, vol. 5, No. 10, October 1966, pp. 1588–1594, by S. C. Cohen entitled "Heterodyne detection: phase front alignment, beam spot size and detector uniformity" that appeared in Applied Optics, vol. 14, No. 8, August 1975, pp. 1953–1959, by St. Fowler et al., entitled "Analysis of heterodyne efficiency for coherent laser radars" that appeared in SPIE, vol. 1936, 1993, pp. 137–146. In particular, 30 alignment tolerances are given by Siegman's theorem in the article written by Siegman mentioned above:

$$A_R \Omega_R = \lambda^2 \quad (1)$$

$A_R$ is the equivalent reception area and $\Omega_R$ is the solid detection angle. In general, this relation is satisfied for extremely low values of $\Omega_R$. The result is particularly tight alignment tolerances that partly explain the difficulties of implementing coherent detection at short wave lengths.

A number of techniques have been suggested to get around alignment problems, in patents EP-164 181, U.S. Pat. Nos. 5,114,226 and 4,611,912.

EP-164 181 uses an optical fibers device and a coupler for mixing the two beams. U.S. Pat. No. 5,114,226 uses a modified form of Michelson's interferometer comprising a reflector, a polarizing cube and a λ/4 beamsplitter plate. In US-4,611,912, an interferometer with a single measurement arm is made by using a partially reflecting beamsplitter plate in the measurement beam.

These complex assemblies have been used to make industrial devices that remain fragile, expensive and the dimensions of which are incompatible with the microsystem approach for large scale, or even collective, manufacturing.

Various methods have been suggested for minimizing speckle effects. Van Cittert Zernike's theorem provides a criterion for sizing the reception pupil by expressing the radius of coherence ρc at the pupil, as a function of the wave length λ and the apparent diameter θs of the laser spot on the target:

$$\rho c = \frac{\lambda}{\theta s} \quad (2)$$

This formula shows that optimum detection conditions are obtained when the emission and reception pupils are the same size and when the beam is focused on the target. This method has been given priority in documents EP-164 181 and U.S. Pat. No. 5,114,226; the focusing distance is fixed by construction, which gives the device a field depth of a few meters around the focusing point. One alternative for increasing the field depth is to use a dynamic focusing system. This method has two disadvantages; the low rate of measurements and the complexity of the device. Filtering by mode is possible by using single mode fibers, but coupling difficulties form a major problem. In U.S. Pat. No. 4,611,912, the measurement beam is collimated and spatial filtering is used in the focal plane of the reception lens. This technique is difficult to use; placement of a very small diaphragm (about 10 μm) at the focal point of the reception optical system is difficult, and considerably attenuates the signal.

One method of solving the alignment problems consists of using the laser as a light transmitter and receiver.

Thus, according to the principle of inverse return of light, the emission and measurement beams are necessarily aligned.

This detection principle is known as the "Backscatter-modulated lasers" or as "Self-Mixing". Further information on this subject is given in the article by P. J. de Groot et al., entitled "Ranging and velocity signal generation in a backscatter-modulated laser diode", that appeared in Applied Optics, vol. 27, No. 21, 1988, pages 4475–4480.

This detection principle uses various physical properties of the amplifying medium to make an efficient detection means. There is a simplified manner of summarizing the physical process as follows; modulation of the laser intensity is observed when an infinitely small part of the light emitted by the laser returns into the laser after reflection or diffusion on a moving target. The intensity modulation is due to non-linear effects present in the amplifying medium, for example such as saturation effects. The intensity modulation includes the Doppler frequency characteristic of the moving target. Appropriate processing of the signal emitted by a detector measuring the intensity modulation can thus be used to determine the speed or displacement of the target that intercepts the laser beam.

Document U.S. Pat. No. 4,928,152 shows a device embodying the principle of autodyne detection.

This device includes a laser diode. One problem with this type of device is that when the target returns too much light in the cavity of a laser diode, large intensity instabilities make it impossible to measure the intensity modulation.

In particular, instabilities are due to excessive coupling between the laser diode cavity and the target.

Another cause of instability is the high gain in the laser diode cavity; this is of the order of 100 cm$^{-1}$ for laser diodes commonly available on the market.

A third cause of instability of laser diodes is non-linear coupling of electrons and photons. This coupling is characterized by a coefficient α that may be considered as a measurement of the non linearity of the laser. The coefficient α, proportional to the partial derivative of the index n of the active medium with respect to the number N of population inversions in the laser, is of the order of 3 to 7 for laser diodes commonly available on the market.

Non-linearity and instability phenomena of laser diodes are described in more detail in the article written by K.

Otsuka entitled "Non-linear phenomena in semiconductor lasers", SPIE, vol. 1497, pages 432–443.

Another disadvantage of this type of detection using a laser diode is due to the fact that intensity modulation is significant when the diode is operating close to the threshold. The laser power is minimum close to the threshold. Furthermore, a laser diode cannot be used to measure distances above a certain limit (more than 10 meters). Another limiting point of a laser diode is due to its coherence length. It is known that good quality interference can be produced using a coherence length preferably equal to several orders of magnitude of the distance to be measured. However, the coherence length of ordinary laser diodes available on the market rarely exceeds 10 m, which in practice limits the ranges of range finding devices using any form of coherent detection.

Another disadvantage of the detection mode using a laser diode is due to difficulties of coupling the signal backscattered by the target, in the laser diode cavity.

The article written by K. Otsuka et al., entitled "Ultrahigh sensitivity laser Doppler velocimetry with a microchip solid-state laser" Applied Optics, Feb. 1994, vol. 33, No. 6 can be used to make precise speed measurements using a "microchip" type laser (microlaser). Use of this type of laser solves instability problems inherent to the use of laser diodes. In microlasers, the reflectivity of the output mirror is high (of the order of 98%), the gain in the laser cavity is low (of the order of 0.1 cm$^{-1}$), and the coefficient $\alpha$ is practically zero.

The main disadvantage of microlaser devices is due to the fact that the intensity modulation is only significant when the Doppler frequency is close to the relaxation frequency $F_R$ of the laser.

The relaxation frequency $F_R$ of the laser is defined by the following relation:

$$F_R = \frac{1}{2\pi} \sqrt{\frac{r-1}{\tau_p \tau_f}}$$

where $\tau_p$ the life of photons in the laser cavity, where $\tau_f$ is the life of the laser transition and r is a pumping parameter of the laser cavity. Thus in order to carry out a speed measurement, the relaxation frequency must be continuously adjusted as a function of the target speed. Some authors suggest that the pumping coefficient r should be adjusted to match the laser relaxation frequency to the Doppler frequency corresponding to the movement of the target. These arrangements make the electronic circuits associated with the speed measurement device very complex and do not facilitate the measurements.

Finally, a limitation of the devices described above is that practically none of them can measure the speed and distance of an object simultaneously, in other words cannot operate as a speed measurement and range finding device at the same time.

Consequently, the purpose of this invention is to propose a device that does not have the limitations and constraints mentioned above.

One particular purpose is to propose a speed measurement and range finding device that are not unstable.

Another purpose is to propose a speed measurement and range finding device capable of directly measuring the speed of a target within a wide range of speeds without adjusting the pumping parameter.

Another purpose is to propose a speed measurement and range finding device in which there are no problems in aligning the emission and measurement beams.

Another purpose is to propose a speed measurement and range finding device that are not very sensitive to a coherence fault in the measurement beam.

Another purpose of the invention is to propose a speed measurement and range finding device that do not have cross modulation problems.

A final purpose is to propose a speed measurement and range finding device with a simple and inexpensive design.

DISCLOSURE OF THE INVENTION

The purpose of this invention is a laser speed measurement and range finding device with coherent detection comprising:

a microlaser with continuous emission, comprising an active laser medium and a microlaser cavity, means of modulating an optical frequency of a beam emitted by the microlaser, means of outputting a signal depending on:
firstly, the Doppler frequency $$F_D = \frac{2v}{\lambda},$$

where $\lambda$ is the microlaser emission wave length and v is speed of a target to be detected, secondly, a modulation frequency $F\tau$ caused by interference in the cavity, of the frequency modulated laser oscillation and a measurement signal, or a signal obtained by reflection or diffusion on a target placed at a certain distance.

Another purpose of the invention is a speed measurement and range finding device of the coherent detection type, comprising:

a microlaser with continuous emission, means of modulating the optical frequency of a beam emitted by the microlaser, means of transmitting the beam emitted by the microlaser towards a target, to receive a measurement signal from the target and to transmit this measurement signal to the laser active medium, means of detecting an interference signal between the laser oscillation in the cavity and the measurement signal, amplified in the active laser medium, and the reference beam.

Means may also be provided for taking a reference beam from the laser beam emitted by the microlaser.

Another purpose of the invention is speed measurement and range finding device of the coherent detection type comprising:

a microlaser with continuous emission with opposite first and second emission surfaces capable of emitting a first and second beam respectively, means of modulating the optical frequency of the first and second beams, means of transmitting the first beam emitted by the microlaser towards a target, to receive a measurement signal from the target and to transmit this measurement signal to the active laser medium, means of detecting a signal resulting from the interference between the measurement signal and the laser oscillation in the cavity.

The structure of microlasers consists of a stack of multilayers. The active laser medium is composed of a thin material, for example between 150 and 1000μm, and small dimensions (few mm²), in which dielectric cavity mirrors may be deposited directly. The active laser medium may be pumped by a laser diode, for example III–V, which is either directly hybridized on the microlaser, or is coupled to the microlaser through an optical fiber. Microlasers may be made collectively using micro-electronic means. They usually have a continuous emission of a few tens of milliwatts of power, or they may triggered either passively or actively.

Consequently, the microlaser used in the speed measurement/range finding device according to the invention is distinguished by a laser diode, in which the active medium is a semiconductor and which is electrically pumped.

The speed measurement device according to the invention is of the autodyne type, or with coherent detection; the microlaser emits a first light beam towards a target and receives the reemitted light, in other words the light reflected or diffused by the target. This light, by the inversely return principle, passes through the same optical means that were used to send the first emission beam onto the target.

Thus there is no misalignment between the light emitted from the first beam and the measurement light returned by the target. Consequently, it is possible to make measurements using radiation with a short wave length.

Interference between the light in the emitted beam and the light returned by the target takes place in the microlaser (autodyne detection principle). This principle only requires a very small quantity of light, and can therefore operate with very low intensity beams, compatible with user ocular safety standards.

The fact of making coupling in the microlaser cavity can reduce the size of the input pupil in the reception system. The phenomenon is beneficial to the return signal that returns into the zone in which the Fabry-Pérot cavity was created. This is the zone in which the thermal guide was created by the pump beam, therefore over the length of the microlaser and over a diameter of about 100μm. This phenomenon will not affect any signal outside this zone, which is why the pupil is small so that very compact systems can be made with performances equivalent to or better than devices with a pupil of between 30 and 50 mm.

The microlaser also performs spatial filtering of light coming from the target. The laser mode forms a spatial filter that rejects non coherent light coming from the target. The spatial filtering supplied by the microlaser is particularly related to the shape of the pumping beam emitted by the microlaser pumping means. Thus the microlaser avoids coherence problems between the emission beam and light returned from the target.

The device according to the invention differs from pulse range finding devices in that the microlaser used emits a continuous, frequency modulated wave. Similarly, the invention differs from phase comparison range finding devices in that the beam emitted by the microlaser is not amplitude modulated, as for example is described in document FR-2 706 602 for which a phase measurement is made between a periodic signal emitted towards the target and the signal backscattered by the target.

The device according to the invention can be used to make a simultaneous measurement of the speed and distance of a target, within a wide range of speeds and distances, without needing to adjust a pumping parameter.

Therefore the invention relates to a laser range finding and speed measurement device that solves problems of matching fields on the detector, and optical signal intensity and phase fluctuations.

Since a microlaser is used, the device according to the invention is not very sensitive to a coherence fault in the measurement beam.

Finally, in the third embodiment described above, the device according to the invention can avoid cross modulation problems.

In any case, the microlaser cavity may be stable; one of the two mirrors in the cavity is then a concave mirror.

Means of modulating the optical frequency of the laser beam may include either an electro-optical element or a piezoelectric element. A voltage variation is applied to this element which varies its optical index, and therefore the optical index of the cavity that contains it.

Finally, the device may be provided with treatment means to determine the characteristic magnitudes of the speed and the position of a target.

BRIEF DESCRIPTION OF THE FIGURES

In any case, the characteristics and advantages of the invention will become clearer when reading the following description. This description deals with example embodiments given for explanatory purposes and in no way limitative, referring to the attached drawings in which:

FIGS. 2A to 2C are examples of optical frequency modulation,

DETAILED DESCRIPTION OF AN EMBODIMENT OF THE INVENTION

A first embodiment of the invention will be described with reference to FIG. 1.

Figure 1:
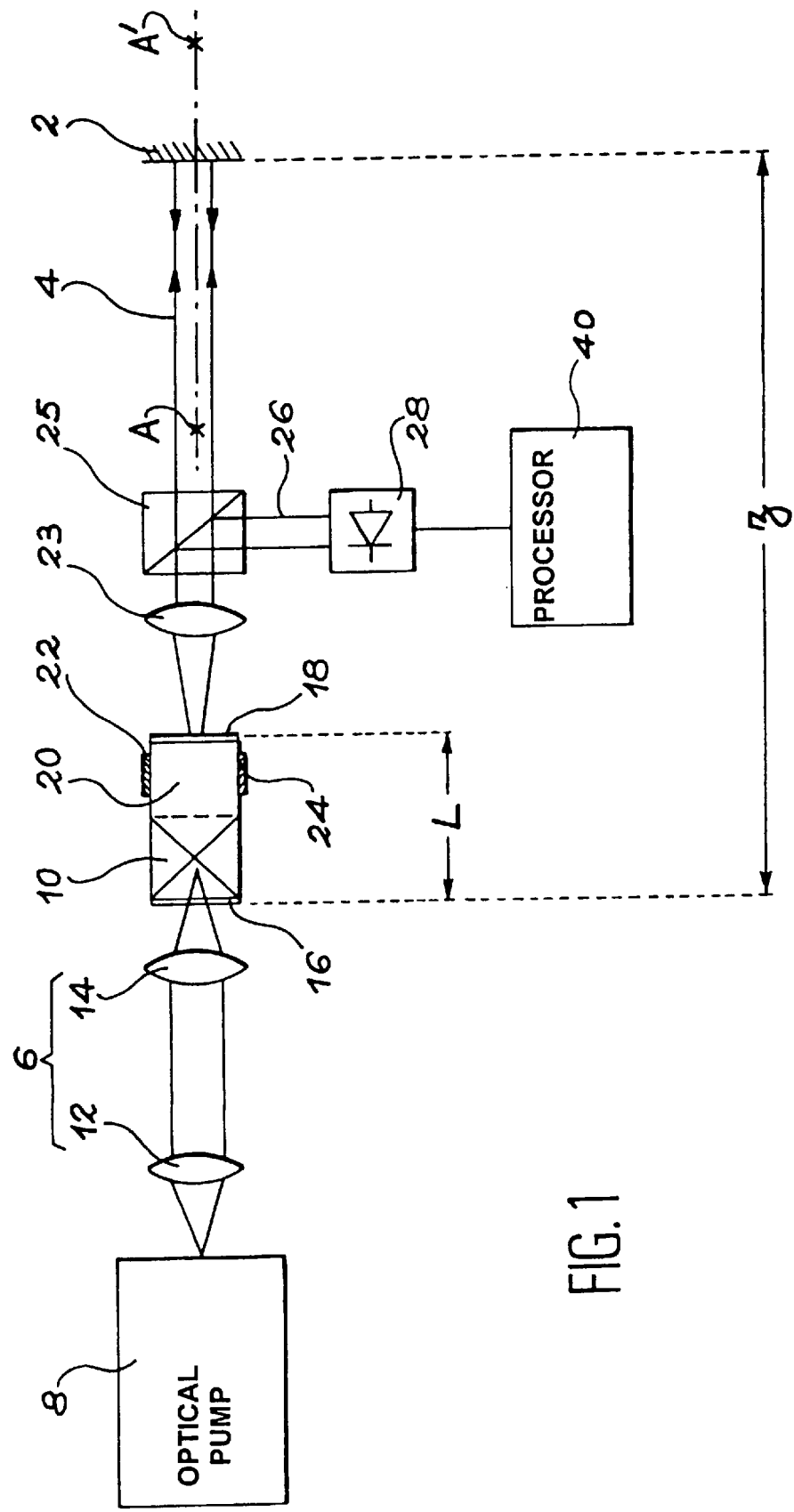
FIG. 1 shows the first embodiment of the invention.

FIG. 1 shows a range finding and speed measurement device which measures the projection V of the speed vector onto the optical axis AA' of a target 2 with a reflection coefficient $r_{2ext}$, and at the same time the distance Z between the target and the device. The target intercepts a continuous laser beam 4, the emission of which is frequency modulated.

The device actually includes two subassemblies. The first subassembly forms the emission part and the second subassembly forms the reception part.

The emission subassembly comprises:

an optical means 8 for pumping an amplifying laser material 10, an assembly 12, 14 forming a collimation and focusing lens for the beam emitted by the pumping means 8; this assembly 12, 14 may consist of a single part; for example a GRIN lens that performs the collimation and focusing functions, the laser amplifying medium 10 inserted in a Fabry-Pérot cavity delimited by an input mirror 16 (with reflectivity $r_1$ at the microlaser wave length $\lambda_L$) and an output mirror 18 (with reflectivity $r_2$ at $\lambda_L$), the distance between the two mirrors being denoted L, means of modulating the laser emission frequency; on FIG. 1, these means are composed of an electro-optical element 20 located between two electrodes 22, 24 to which a control voltage may be applied using means not shown on the Figure, optical means 23 of collimating the emitted laser beam, means 25 (for example, a beam separator) to take a sample of a reference beam 26 from the emitted beam 4, and sending it to photo-detection means 28. The means 25, shown in the form of a separating cube, may also be of the fibered assembly type, in which the same function is performed by a two-way dichroic multiplexer.

Preferably, the pumping means 8 consist of a laser diode. The optical means (lenses) 12, 14, may be either single lenses, or GRIN type lens, or any other combination of optical components in order to focus the pumping beam within the active laser medium 10.

The laser amplifying medium (solid, monolithic) may for example be composed of a basic dielectric material chosen among $Y_3Al_5O_{12}$, $LaMgA_{11}O_{19}$, $YVO_4$, $Y_2SiO_5$, $YLiF_4$ or $GdVO_4$ and may be doped with neodyne ions (Nd for an emission of 1.06 $\mu$m), or erbium ions (Er for an emission around 1.5 $\mu$m), or thulium ions (Tm for an emission of around 2 $\mu$m), holmium (Ho for an emission of around 2 $\mu$m), or it may be codoped with erbium et ytterbium ions (Er+Yb for an emission of around 1.5 $\mu$m), or may be codoped with thulium and holmium (Tm+Ho for an emission of around 2 $\mu$m).

The amplifying medium is a microlaser. This type of device emits a low divergence, very circular, single mode beam ($TEM_{00}$) and furthermore enables the use-of a single lens for the collimator (which is impossible with a laser diode). In this case a fixed lens is used to make the beam parallel.

The range of this type of laser device is much longer that the range of existing devices, particularly devices that use a diode, and the laser emission power is less than or equal to the ocular safety limit determined by standards in force.

The modulating element 20 of the laser beam may be of the piezoelectric or electro-optical type, and as illustrated in FIG. 1, may be inserted in the microlaser cavity. Electrodes 22 and 24 can be considered to form the armature of a flat capacitor in which the modulating element 20 is placed.

The electro-optical element may for example be composed of one of the following elements: $LiTaO_3$ or $KH_2PO_4$ (KDP), or $KD_2PO_4$, or $NH_4H_2PO_4$ (ADP), or Quartz, or CuCl, or ZnS, or semiconductors such as GaAS, or $LiNbO_3$, or GaP, or $BaTiO_3$.

For example for a piezoelectric element, ferroelectric materials such as $BaTiO_3$, $LiTaO_3$, or $La_2Ga_5SiO_{14}$ could be chosen.

Figure 2A:
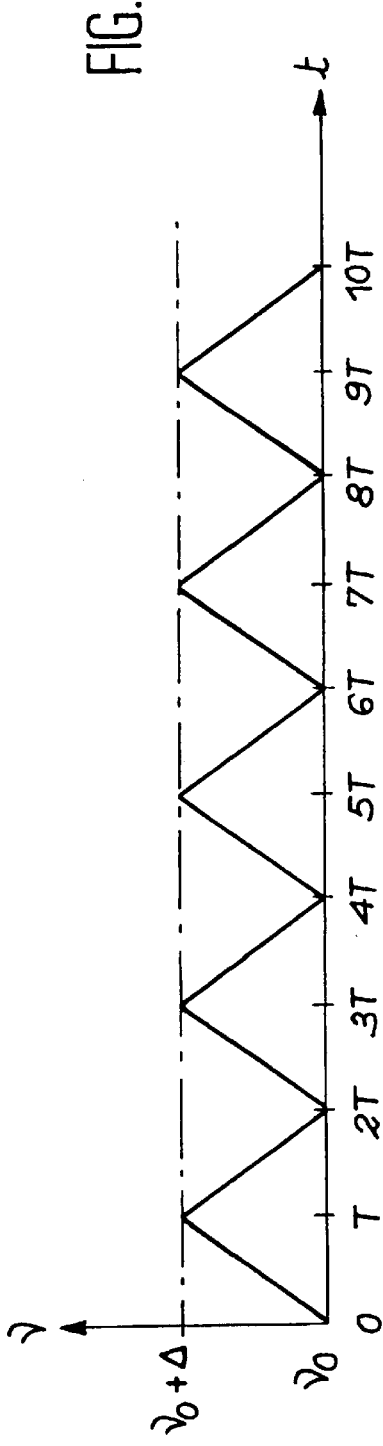

For example, the modulating element used to scan the optical frequency could use linear scanning similar to those for which the time variations are shown in FIGS. 2A, 2B and 2C.

Frequency scanning is obtained by applying a modulation voltage on electrodes 22, 24, so that an electric field E can be created in the modulating element.

If the modulating element is electro-optic, the presence of the field E induces a variation of the refraction index and therefore modifies the optical path nL (where n is the optical index of the medium and L is its physical wave length) of the cavity. Let:

$v_0$ be the initial laser emission frequency, $\Delta$ be the frequency excursion, $n_0 L_0$ be the initial optical path in the cavity, $\delta$ (nL) be the variation of the optical path under the effect of the modulation signal, in this case the frequency scanning $\Delta$ is equal to $$\Delta = v_0 \frac{\delta(nL)}{n_0 L_0}$$

If $F_M=1(2T)$ is the modulation frequency, it is found that the cavity quality factor is modulated at frequency $F_M$.

In the case of a piezoelectric element, the above formula is valid, where L is a function of the electric field (the field E induces a deformation of the cavity length).

The reception subassembly comprises:

optical means 23 that enable reception of the laser light reflected by object 2, means 25 of recombining the reference beam 26 and the measurement beam, a detection assembly, for example comprising a photo-electric detector 28.

We will now describe operation of the device.

Since target 2 returns light inside the laser, its contribution to the reflectivity $r_2$ of the output mirror 18 will be taken into account. More precisely, there is interference in the cavity between light originating from the target and the laser oscillation, and this effect may be taken into account in the reflectivity of the output mirror 18. Therefore, this may be considered as a mirror with equivalent reflectivity $r_2$ (v):

$$r_2(v) = \frac{r_2 + r_{2ext}\exp[-j2\pi v_L \tau]}{1 + r_{2S}r_{2ext}\exp[-j2\pi v_L \tau]},$$

where $v_L$ is the optical frequency of the laser emission, and $\tau$ is the flight time in the cavity.

More precisely, we can write:

$$\tau = \frac{2(Z-L)}{V},$$

where v is the speed of light in the cavity.

In laser range finding and speed measurement, we usually have $r_{2ext} \ll r_{2S}$, such that a limited development of $r_2$ (v) can be made :

$$r_2(v) = r_{2S} + (1 - r_{2s}^2) r_{2ext} \cdot \exp(-2\pi j v \tau).$$

This expression may also be put in the following form:

$$r_2(v) = |r_2| \exp(-j\phi_r)$$

where $$|r_2| = r_{2S}[1 + K_{ext}\cos(2\pi v \tau)]$$

and $$\phi_r = K_{ext}\sin(2\pi v \tau)$$

and in which we define:

$$K_{ext} = \frac{r_{2ext}}{r_{2S}}(1 - |r_{2S}|^2).$$

These formulas indicate that the presence of the target in the optical path of the laser beam induces a modulation of the reflection coefficient $|r_2|$ and the phase $\phi_r$ of the equivalent mirror. We can show that the disturbance on the emission frequency is negligible in the case of the microlaser (this is not true for a laser diode because in this case $\alpha \neq 0$); in range finding, there is a reflectivity $r_{2ext}$ (that can be called "effective" because it takes account of several effects, particularly diffusion on the target and absorption in the propagation medium) that varies approximately from $10^{-1}$ and $10^{-6}$; assuming $r_{2S}=0.98$, according to the last expression written above, the coupling coefficient $K_{ext}$ varies from $4.10^{-3}$ to $4.10^{-8}$.

The variation of the laser emission frequency is written:

$$\Delta\nu_{max} = \frac{\phi_r}{2\pi \cdot \tau_l} = \frac{K_{ext}}{2\pi \cdot \tau_l}$$

Assuming $\tau_1$=0.3 ns (typical value) and using the above numeric data, we obtain a variation of $\Delta\nu_{max}$ from 21.22 Hz to 2.12 Mhz, which may be considered as being negligible compared with the scanning of several tens of gigahertz (typically 10 GHz) done in FMCW range finding.

However the variation of the laser intensity is not negligible despite the low values of $K_{ext}$. The resonant nature of the microlaser around the stationary condition makes it possible to substantially amplify small variations in the reflectivity of mirror 18 due to the presence of an object on the optical path of the emitted laser beam.

By introducing the equivalent reflectivity $r_2(\nu)$, we can write the quality factor Q of the microlaser cavity optical resonator:

$$Q = \frac{2\pi\nu \cdot nl}{C[\alpha_s l - \ln|r_1 - r_2(\nu)|]},$$

which can also be written:

$$Q = Q_0[1-\beta\cdot\cos(2\pi\nu\tau)],$$

where $Q_0$ is the quality factor of mirrors 16 and 18 alone, without the presence of target 2:

$$Q_0 = 2\pi\nu\frac{nl}{C[\alpha_s l - \ln(r_1 r_{2S})]},$$

and where:
- $\nu$ is the laser emission frequency,
- n is the refraction index of the amplifying medium,
- $\alpha_s$ is the coefficient of losses other than due to mirrors, for example by diffusion due to imperfections in the laser crystal. These are generally low if the crystal is of good quality $-\alpha_s \ll 0.001$ cm$^{-1}$.
- l is the length of the laser cavity $$\beta = \frac{K_{ext}}{\ln(r_1 r_{2S}) - \alpha_s l}$$

Furthermore, it is also possible to introduce optical elements between the target 2 and the output mirror 18. Under these conditions, the definition of the values of $\beta$ given above is modified.

For example, if the laser beam is collimated by a single lens placed at the focal distance F from mirror 18, it can be demonstrated that the coefficient $\beta$ can be written:

$$\beta = \left(\frac{\tau\rho}{R_{2S}}\right)^{1/2} \frac{\lambda}{a} \frac{F}{z-F} \quad \text{if } Z \gg F,$$

where:
- $\tau$ is the transmission of the lens and the propagation medium at $\lambda$,
- $\rho$ is the Albedo of the diffusing target,
- $R_{2S}$ is the intensity reflection coefficient of the mirror 18 ($R_{2S}=r^2_{2S}$),
- F is the focal length of the thin lens,
- Z is the distance between target 2 and mirror 18;
- a is the diameter of the laser beam emitted at the mirror 18.

It can be shown that the quality coefficient Q is a function of time, particularly when the laser frequency $\nu$ is a function of time and when the target is fixed, or is moving.

When the target is moving and when a frequency modulation is made, the expression for the quality factor is:

$$Q(t)=Q_0[1\beta\cos(2\pi\nu(t)\tau(t))].$$

If we consider the special case in which the velocity of the moving object is uniform and the modulation is in the form of a double ramp, then according to the scheme shown in FIG. 2A:

$$\tau(t) = \frac{2(Z_0 - L + V \cdot t)}{\nu} = \tau_0 + \frac{2V}{\nu}t$$

$$\nu(t) = \nu_0 + \Delta\frac{t}{T} \qquad 0 < t < T$$

$$\nu(t) = \nu_0 + 2\Delta - \frac{\Delta}{T}t \qquad T < T < 2T$$

by replacing these expressions in the expression for Q(t) given above, we obtain the following relations:

for $$0 < t < T$$

$$Q(t) = Q_0\left\{1 - \beta\cos\left[\nu_0\tau_0 + (F_D + F\tau)t + \frac{\Delta}{T}\frac{2\nu}{\nu}t^2\right]\right\}$$

For T<t<2T $$Q(t) = Q_0\left\{1 - \beta\cos[\nu_0\tau_0] + 2\Delta\tau_0 + (F_D - F_\tau)t + \frac{2V}{\nu}2\Delta t - \frac{\Delta}{T}\frac{2V}{\nu}t^2\right\}$$

where $$FD = \frac{2V}{\lambda}$$

(frequency associated with the speed of the target), and $$F\tau = \frac{\Delta\tau_0}{T}$$

(frequency associated with the flight time $\tau_0$)

Making the assumptions that:

$$\nu \gg V,$$

$$\Delta \ll V_0,$$

which are always true in practice, we get:

$$Q(t)=QO\{1-\beta\cos[\phi 0+2\pi F_1 \cdot t]\}, 0<t<T$$

$$Q(t)=QO\{1-\beta\cos[\phi 0'+2\pi F_2 \cdot t]\}, T<t<2T$$

where $F_1=F_D+F_{96}$ and $F_2=F_D-F_\tau$

Conventional signal processing can determine the speed V and the distance Z using frequencies $F_1$ and $F_2$.

We obtain the following from the above relations:

$$V = \frac{F_1 - F_2}{2} \frac{\lambda}{2}$$

and $$Z = \frac{F_1 + F_2}{2} \frac{T}{\Delta} \frac{v}{2}$$

FIGS. 2B and 2C give other modulation shapes. Formulas equivalent to the formulas given above can be obtained using the same reasoning.

In practice, the pumping means 8 create a population inversion $N_0$ in the amplifying medium 10.

Mirrors 16, 18, which are used together to form an optical resonator with a quality factor Q, are used to select a propagation mode. The minimum population inversion to obtain laser emission is denoted Nth. For $N_0 > N_{th}$, a laser oscillation is sustained in the amplifier; a laser beam 4 is emitted through the mirror 18. At the same time, a modulation voltage is applied to the electrodes located on each side of the modulation element 20. Therefore the frequency of emitted beam 4 varies in time as a function of the voltage applied to the modulation element 20.

On its path, the beam 4 is firstly collimated by lens 23 and is then split by the splitter lens 25. Part 26 of the beam is used as a reference and is directed to the detection means 28. The other part of the beam is sent to the target. The measurement beam is diffused or reflected by the target. A fraction of the energy is propagated to the reception lens 23 that returns the measurement beam to the optical amplifier consisting of the amplifier material 10 and mirrors 16 and 18. After amplification in this structure, the beam returns towards the lens 25, and part of the amplified signal is sent to the detection means 28. The result of the interference in the active medium 10, between the frequency modulated laser oscillation and the beam reflected or diffused by the target, is used to extract information about the speed and position of the target 2.

If frequency scanning is used with the shape shown in FIG. 2A, the linear modulation law of the optical frequency in each time interval is written as follows:

$$v(t) = v_0 + \frac{\Delta}{T} \cdot t \text{ for } mT < t < (m+1) \cdot T$$

$$v(t) = v_0 + 2\Delta - \frac{\Delta}{T} \cdot t \text{ for } (m+1) \cdot T < t < (m+2)T$$

$$m = 0, 1, 2, \ldots$$

After filtering and conversion of the photocurrent, the photoelectric signal is written as follows:

$$S_{AC}(t) = I_0 G(F_D + F_\tau) \cdot \cos[2\pi(F_D + F_\tau) \cdot t] \text{ for } mT < t < (m+1)T$$

and $$S_{AC}(t) = I_0 G(F_D - F_\tau) \cdot \cos[2\pi(F_D - F_\tau) \cdot t] \text{ for } (m+1)T < t < (m+2)T$$

$m = 0, 1, 2 \ldots$ where the frequency $$F_D = \frac{2V}{\lambda}$$

is equal to the Doppler frequency $$\frac{2V}{\lambda}$$

associated with the speed V of the moving object and the electromagnetic wave of wave length $\lambda$. The speed V actually represents the projection of the speed vector $\vec{V}$ onto the optical axis of the microlaser.

$F_\tau$ is the modulation frequency of the microlaser cavity quality factor, caused by the presence of a target at distance Z and frequency scanning, for example as shown in FIG. 2. This frequency is proportional to the flight time "$\tau$" and therefore to the distance to be measured:

$$F_\tau = \Delta \frac{\tau}{T}$$

$I_0$ is the light intensity injected into the laser and originating from the target (in watts).

$G(F_D \pm F_\tau)$ is the gain of the autodyne detection

T is the modulation recurrence

C is the speed of light (equal to $3.10^8$ m.s$^{-1}$)

$\lambda$ is the wave length $\Delta$ is the modulation excursion.

Signal processing can measure frequencies $F_1$ and $F_2$ defined by the following relations:

$$F_1 = F_D + F_\tau \text{ for } mT < t < (m+1)T$$

$$F_2 = F_D - F_\tau \text{ for } (m+1)T < t < (m+2)T$$

The measurement of $F_1$ and $F_2$ jointly can be used to determine the distance (Z) and the speed (V) of the object using the following formulas:

$$Z = \frac{F_1 + F_2}{2} \cdot \frac{T}{\Delta} \cdot \frac{C}{2}$$

$$V = \frac{F_1 + F_2}{2} \cdot \frac{\lambda}{2}$$

Signal processing may be done using means 40, for example a specially programmed conventional computer.

Functions for the time variation of the frequency different from those shown in FIG. 2A are possible (see FIGS. 2B, 2C), and Z and V can be recalculated as a function of the time variations using the same type of reasoning as is described above.

Figure 3:
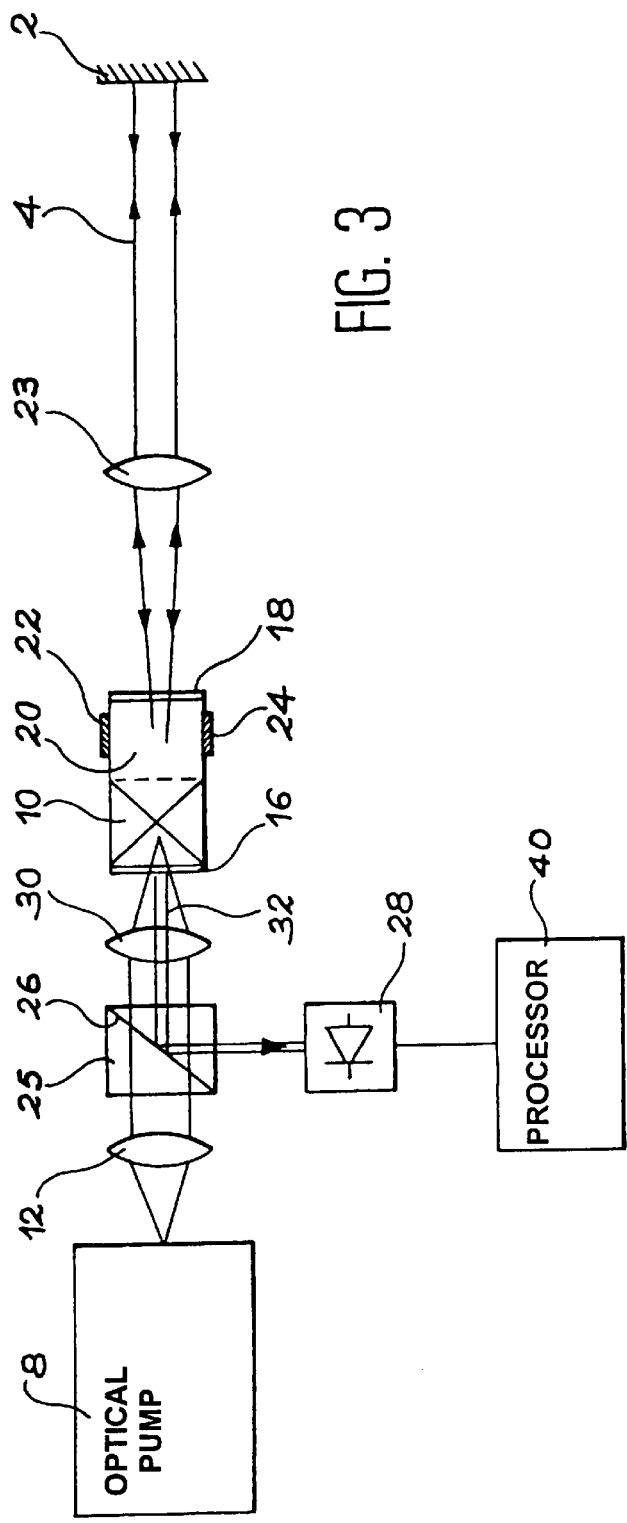
FIG. 3 shows a second embodiment of the invention.

Another embodiment of the invention is illustrated in FIG. 3, on which numeric references identical to those shown in FIG. 1 denote identical or corresponding elements.

In this second embodiment, the separating element 25 is located between the pumping source 8 and the microlaser 10. In the case of a separating cube, the cube is preferably of the dichroic type in that it allows the pump beam to pass at wave length $\lambda$ without any significant modification, but efficiently reflects the beam 32 (at wave length $\lambda$) to detection means 28. The beam separation function can be made by suitable dielectric treatment of the interface composed of the diagonal face 26 of the cube 25.

The microlaser emits a laser beam 4 towards the target 2, and a laser beam 32 towards separating means 25 and detection means 28. Thus, when optical pumping provided by pumping means 8 is sufficient to go beyond the laser threshold, the microlaser emits two laser beams. The pumping limit for emission of the beams depends on the amplifying material 10 and also on mirrors 16 and 18.

Microlaser beams are emitted by the first and second surfaces 16, 18 of the laser respectively, and are denoted by first 4 and second 32 beams. The first and second beams 4, 32, are colinear and are emitted in opposite directions.

As in the first embodiment, the focusing and collimation means 23 can focus light reflected or diffused by target 2 into the microlaser, which also forms a receiver and an amplifier for light (diffused or reflected) reemitted by the target (measurement signal). The means 28 can be used to detect a signal resulting from interference in the microlaser cavity between the modulated laser oscillation and the measurement signal.

If the separating element 25 is a cube, the inclined surface of the cube 25 that directs the reference beam towards the detection element 28 is fairly transparent at the wave length $\lambda_p$ (for example about 0.8 $\mu$m) of the pumping light and is reflecting for the wave length $\lambda$ emitted by the microlaser.

In the device shown in FIG. 3, light reflected or diffused by the target does not directly reach the detection means 28. This light is received by the microlaser and is stopped mainly by mirror 16 forming the second surface of the microlaser. The detection means 28 are thus to a large extent optically isolated from light originating from the target. Conversely, the microlaser is not very disturbed by light diffused and reflected on the detector.

In fact the assembly shown in FIG. 3 avoids cross modulation problems between emission and reception. In the assembly shown in FIG. 1, part of the signal originating from the target may be reflected at the surface of mirror 18 and by self-collimation, may be mixed with the modulation signal detected by detection means 28.

In this second embodiment, the speed and distance of the target are determined in the same way as in the first embodiment and using the same equations.

Microlasers and their cavities have been shown-as a plane-plane cavity in both of the above embodiments, at the stability limit. It is also possible to make one of the mirrors, for example the input mirror 16, in the form of a curved mirror; this then gives a stable plane, concave cavity. A cavity can also be used in which the two input and output mirrors 16, 18 are curved; this also gives a stable cavity. The use of a stable cavity can substantially reduce the laser excitation threshold $N_{th}$. A pumping diode 8 with lower power can then be used, which reduces the manufacturing cost.

In the invention described above, the laser behaves like a transmitter of a coherent radiation and like a receiver, demodulator, and optical amplifier of the signal returned from the target. The optical demodulation phenomenon is performed by the laser itself, in that it is capable of modulating its own intensity at frequency $F_D$ and $F_\tau$. Therefore, the detection means perform a secondary role in this invention, unlike in other range finding devices in which the detection means perform a capital role particularly in the case of pulsed range finding and range finding by phase comparison.

This invention can use autodyne detection under good conditions, making use of a microlaser type structure. It can also be used to make range finders with a range at least 100 times greater that a range finder using a laser diode commonly available on the market. Finally, due to the use of a natural resonance mechanism, the microlaser device according to the invention can have a high signal/noise ratio compared with devices according to prior art.

We will now describe a process for an embodiment of a microlaser cavity including a modulation element;

The first step is to choose the laser active material. The possible materials for the laser amplifying medium have already been described above. The emission wave length is a criterion that an expert in the field can use to choose between these different materials.

The second step is to condition the chosen laser crystal; it is oriented and cut into strips with thickness between 0.5 and 5 mm.

In a third step, the strips are ground and polished, which removes the surface work hardened layer due to cutting, and also reduces the thickness of the beamsplitter plates to a thickness slightly greater than the microlaser specification. The ground beamsplitter plates, with a thickness close to the final thickness, are polished on both surfaces to an optical quality. Cutting, grinding and polishing are done using known processes and machines known to experts in the field.

The modulation element 20 is then chosen, prepared and cut to give it the required thickness. This element is assembled with the laser active medium by gluing these two elements.

The fifth step is to deposit the input and output mirrors. Preferably dichroic mirrors are used obtained by depositing dielectric multilayers.

The next step is to cut beamsplitter plates to obtain individual microlaser chips, each chip being usable in a speed measurement and range finding device according to the invention. The platelets comprising the mirrors, the laser active medium, and the modulation means are cut by a diamond saw similar to those used in microelectronics for cutting Si chips, to obtain laser chips with a cross-section of a few mm$^2$.

An additional step may be performed if it is required to make a micro-lens on either of the surfaces in order to form a stable cavity. Thus, the micro-lenses may be engraved directly on the laser material using technologies used frequently in microelectronics.

Another embodiment of this step is to start by making the microlenses from another material (photosensitive resin, silica, etc.) and then to hybridize them (for example by gluing with an optical glue) using the polished surface of the laser material. The article by A. EDA et al., CLEO'92, paper CWG 33, page 282, 1992 (conf. on Laser and Electrooptics, Anaheim, USA, May 1992) describes a method of making a microlens network in a transparent material (silica, etc.) on the surface of a laser material. The typical dimensions of the microlenses obtained are:

diameter: from 100 to a few hundred microns, radius of curvature: from several hundred micrometers to several millimeters.

I claim:

1. Laser speed measurement and range finding device with coherent detection comprising:

a solid monolithic microlaser (16, 10, 18) with continuous emission, comprising an active laser medium (10) and a microlaser cavity (16,18), means (20, 22, 24) of modulating an optical frequency of a beam emitted by the microlaser, means (28) of outputting a signal depending on:

firstly, the Doppler frequency $$F_D = \frac{2V}{\lambda},$$

where $\lambda$ is the microlaser emission wave length and v is the speed of a target (2) to be detected, secondly, a modulation frequency $F\tau$ caused by interference in the cavity, of the frequency modulated laser oscillation and the signal originating from a target (2) located at a certain distance Z.

2. Speed measurement and range finding device of the coherent detection type, particularly according to claim 1, comprising:

a solid monolithic microlaser (10) with continuous emission means (20) of modulating the optical frequency of a beam emitted by the microlaser, means (23) of transmitting the beam (4) emitted by the microlaser towards a target (2), to receive a measurement signal from the target and to transmit this measurement signal to the laser active medium, means (28) of detecting an interference signal in the microlaser, between the laser oscillation in the cavity and the measurement signal.

3. Device according to claim 2, also comprising means (25) for taking a reference beam from the laser beam (4) emitted by the microlaser.

4. Speed measurement and range finding device of the coherent detection type, particularly according to claim 1, comprising:

a solid monolithic microlaser with continuous emission with opposite first (16) and second (18) emission surfaces capable of emitting a first (4) and second (32) beam respectively, means (20) of modulating the optical frequency of the first and second beams, means (23) of transmitting the first beam (4) emitted by the microlaser towards a target (2), of receiving a measurement signal from the target and of transmitting this measurement signal to the active laser medium, means (28) of detecting a signal resulting from interference between the laser oscillation in the cavity and the measurement signal.

5. Device according to one of claims 1 to 4, the microlaser cavity being stable.

6. Device according to claim 1, the means (20) of modulating the optical frequency of the laser cavity comprising an electro-optical element.

7. Device according to claim 1, the means (20) of modulating the optical frequency of the laser cavity comprising a piezoelectric element.

8. Device according to claim 1, also comprising processing means to determine characteristic magnitudes of the target speed and position.

\* \* \* \* \*

UNITED STATES PATENT AND TRADEMARK OFFICE
CERTIFICATE OF CORRECTION

PATENT NO. : 6,100,965
DATED : August 8, 2000
INVENTOR(S) : Nerin

It is certified that error appears in the above-identified patent and that said Letters Patent is hereby corrected as shown below:

Title page,
Section [75], Inventor, delete "Sologve" and insert -- Solorgues --.
Section [56], References Cited, Other Publications, first reference cited, delete "Okamoto set al:" and insert -- Okamoto S. et al: --.

Column 1,
Line 35, delete "30".

Column 3,
Line 40, after "$\tau_p$" insert -- is --.

Column 7,
Line 19, delete "use-of" and insert -- use of --.
Line 63, delete "$F_M=1\ (2T)$" and insert -- $F_M=1/\ (2T)$ --.

Column 9,
Line 42, delete "-" before -- $\alpha$ --.

Column 10,
Line 67, delete "$F_1=F_D+F_{96}$" and insert -- $F_1=F_D+F_\tau$ --.

Column 13,
Line 44, delete "shown-as" and insert -- shown as --.

Signed and Sealed this

Ninth Day of October, 2001

Attest:

NICHOLAS P. GODICI
Attesting Officer  Acting Director of the United States Patent and Trademark Office